United States Patent
Jayanth et al.

(10) Patent No.: US 7,980,085 B2
(45) Date of Patent: *Jul. 19, 2011

(54) COMPRESSOR DIAGNOSTIC SYSTEM

(75) Inventors: Nagaraj Jayanth, Sidney, OH (US); Hung Pham, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/652,826

(22) Filed: Jan. 6, 2010

(65) Prior Publication Data

US 2010/0101250 A1    Apr. 29, 2010

Related U.S. Application Data

(63) Continuation of application No. 10/776,856, filed on Feb. 11, 2004, now Pat. No. 7,647,783, which is a continuation of application No. 09/990,566, filed on Nov. 21, 2001, now Pat. No. 6,758,050, which is a continuation-in-part of application No. 09/818,271, filed on Mar. 27, 2001, now Pat. No. 6,615,594.

(51) Int. Cl.
*F25B 49/00* (2006.01)
*H02H 5/04* (2006.01)
*H02H 7/08* (2006.01)
*F21V 7/04* (2006.01)

(52) U.S. Cl. .................. 62/126; 62/127; 361/31

(58) Field of Classification Search ............ 62/125–130, 62/230; 702/34; 706/912; 318/434, 490; 340/648, 635, 683; 361/22, 23, 30, 31
See application file for complete search history.

(56) References Cited

U.S. PATENT DOCUMENTS

| | | |
|---|---|---|
| 2,054,542 A | 9/1936 | Hoelle |
| 3,232,519 A | 2/1966 | Long |
| 3,298,192 A | 1/1967 | Morgan |
| 3,312,081 A | 4/1967 | Berger et al. |
| 4,038,061 A | 7/1977 | Anderson et al. |
| 4,307,775 A | 12/1981 | Saunders et al. |
| 4,325,223 A | 4/1982 | Cantley |
| 4,381,549 A | 4/1983 | Stamp, Jr. et al. |
| 4,387,368 A | 6/1983 | Day et al. |
| 4,441,329 A | 4/1984 | Dawley |
| 4,463,571 A | 8/1984 | Wiggs |

(Continued)

FOREIGN PATENT DOCUMENTS

CA    1 151 265    8/1983

(Continued)

OTHER PUBLICATIONS

Non-Final Office Action mailed Jul. 11, 2006 for U.S. Appl. No. 11/294,720 (now U.S. Patent No. 7,222,493).

(Continued)

*Primary Examiner* — Chen-Wen Jiang
(74) *Attorney, Agent, or Firm* — Harness, Dickey & Pierce, P.L.C.

(57) ABSTRACT

A system is provided and may include logic circuitry in communication with an intelligent device. The logic circuitry may process a refrigeration system operating parameter as a function of time and at least one of the logic circuitry and the intelligent device may diagnose a refrigeration system status based on the processing. The intelligent device may output the diagnosis.

54 Claims, 10 Drawing Sheets

U.S. PATENT DOCUMENTS

| | | | |
|---|---|---|---|
| 4,463,573 | A | 8/1984 | Zeno et al. |
| 4,470,092 | A | 9/1984 | Lombardi |
| 4,611,470 | A | 9/1986 | Enstrom |
| 4,653,280 | A | 3/1987 | Hansen et al. |
| 4,722,018 | A | 1/1988 | Pohl |
| 4,722,019 | A | 1/1988 | Pohl |
| 4,755,957 | A | 7/1988 | White et al. |
| 4,848,096 | A | 7/1989 | Funahashi et al. |
| 4,939,909 | A | 7/1990 | Tsuchiyama et al. |
| 4,966,013 | A | 10/1990 | Wood |
| 5,009,075 | A | 4/1991 | Okoren |
| 5,141,407 | A | 8/1992 | Ramsey et al. |
| 5,209,076 | A | 5/1993 | Kauffman et al. |
| 5,248,244 | A | 9/1993 | Ho et al. |
| 5,290,154 | A | 3/1994 | Kotlarek et al. |
| 5,381,669 | A | 1/1995 | Bahel et al. |
| 5,440,895 | A | 8/1995 | Bahel et al. |
| 5,454,229 | A | 10/1995 | Hanson et al. |
| 5,499,512 | A | 3/1996 | Jurewicz et al. |
| 5,533,349 | A * | 7/1996 | Gromala et al. ............... 62/129 |
| 5,535,597 | A | 7/1996 | An |
| 5,613,841 | A | 3/1997 | Bass et al. |
| 5,623,834 | A | 4/1997 | Bahel et al. |
| 5,628,201 | A | 5/1997 | Bahel et al. |
| 5,629,870 | A | 5/1997 | Farag et al. |
| 5,630,325 | A | 5/1997 | Bahel et al. |
| 5,689,963 | A | 11/1997 | Bahel et al. |
| 5,707,210 | A | 1/1998 | Ramsey et al. |
| 5,710,723 | A * | 1/1998 | Hoth et al. ............... 702/181 |
| 5,726,911 | A * | 3/1998 | Canada et al. ............... 702/32 |
| 5,975,854 | A | 11/1999 | Culp, III et al. |
| 6,020,702 | A | 2/2000 | Farr |
| 6,082,971 | A | 7/2000 | Gunn et al. |
| 6,092,378 | A | 7/2000 | Das et al. |
| 6,148,623 | A | 11/2000 | Park et al. |
| 6,158,230 | A | 12/2000 | Katsuki |
| 6,199,018 | B1 | 3/2001 | Quist et al. |
| 6,308,523 | B1 | 10/2001 | Scaringe |
| 6,332,327 | B1 * | 12/2001 | Street et al. ............... 62/127 |
| 6,360,551 | B1 | 3/2002 | Renders |
| 6,453,687 | B2 | 9/2002 | Sharood et al. |
| 6,615,594 | B2 | 9/2003 | Jayanth et al. |
| 6,758,050 | B2 * | 7/2004 | Jayanth et al. ............... 62/126 |
| 6,758,051 | B2 | 7/2004 | Jayanth et al. |
| 7,162,883 | B2 | 1/2007 | Jayanth et al. |
| 7,222,493 | B2 | 5/2007 | Jayanth et al. |
| 7,260,948 | B2 | 8/2007 | Jayanth et al. |
| 7,313,923 | B2 | 1/2008 | Jayanth et al. |
| 7,647,783 | B2 * | 1/2010 | Jayanth et al. ............... 62/126 |
| 2004/0159112 | A1 | 8/2004 | Jayanth et al. |

FOREIGN PATENT DOCUMENTS

| | | |
|---|---|---|
| DE | 38 07 832 A1 | 10/1988 |
| DE | 297 23 145 U1 | 4/1998 |
| EP | 0 453 302 A1 | 10/1991 |
| EP | 0 355 255 | 9/1993 |
| EP | 0 351 272 | 1/1994 |
| EP | 0 877 462 A2 | 11/1998 |
| EP | 0 907 058 A2 | 4/1999 |
| EP | 1 245 912 A2 | 10/2002 |
| FR | 2 472 862 | 7/1981 |
| FR | 2 709 867 | 3/1995 |
| JP | 04-344192 | 11/1992 |
| JP | 07-055299 | 3/1995 |
| JP | 10-288379 | 10/1998 |

OTHER PUBLICATIONS

Non-Final Office Action mailed Jun. 15, 2006 for U.S. Appl. No. 11/201,488 (now U.S. Patent No. 7,162,883).

Non-Final Office Action mailed Oct. 19, 2005 for U.S. Appl. No. 10/822,821 (now U.S. Patent No. 7,260,948).

Non-Final Office Action mailed Apr. 25, 2005 for U.S. Appl. No. 10/776,856 (U.S. Publication No. 2004/0159112).

Final Office Action mailed Oct. 19, 2005 for U.S. Appl. No. 10/776,856 (U.S. Publication No. 2004/0159112).

Non-Final Office Action mailed Aug. 19, 2008 for U.S. Appl. No. 10/776,856 (U.S. Publication No. 2004/0159112).

Non-Final Office Action mailed Sep. 20, 2004 for U.S. Appl. No. 10/625,979 (now U.S. Patent No. 7,313,923).

Final Office Action mailed Mar. 15, 2005 for U.S. Appl. No. 10/625,979 (now U.S. Patent No. 7,313,923).

Non-Final Office Action mailed Feb. 2, 2006 for U.S. Appl. No. 10/625,979 (now U.S. Patent No. 7,313,923).

Final Office Action mailed Jul. 19, 2006 for U.S. Appl. No. 10/625,979 (now U.S. Patent No. 7,313,923).

Non-Final Office Action mailed Jan. 2, 2004 for U.S. Appl. No. 10/281,906 (now U.S. Patent No. 6,758,051).

Non-Final Office Action mailed Jan. 15, 2003 for U.S. Appl. No. 09/818,271 (now U.S. Patent No. 6,615,594).

Notice of Grounds for Rejection regarding Korean Patent Application No. 10-2007-0029922 dated Nov. 26, 2009 received from the Korean Intellectual Property Office. Translation provided by Y.S. Chang & Associates.

Office Action dated Nov. 3, 2009 received from the Brazilian Industrial Property Journal No. 2026 regarding Patent Application No. PI0200990-0. Translation provided by Dannemann, Siemsen, Bigler & Ipanema Moreira.

Notice of Grounds for Rejection dated Jan. 30, 2010 regarding Korean Patent Application No. 10-2009-0016839 received from the Korean Intellectual Property Office. Transcription provided by Y.S. Chang & Associates.

Decision of Rejection regarding Chinese Application No. 200610059645.8 dated Mar. 10, 2010 received from the State Intellectual Property Office of People's Republic of China. Translation provided by Unitalen Attorneys at Law.

Examiner's First Report on Australian Patent Application No. 2008203276, dated May 14, 2010.

Notice of Final Rejection regarding Korean Patent Application No. 10-2007-0029922, dated Jul. 19, 2010 eceived from the Korean Intellectual Property Office. Translation provided by Y.S. Chang & Associates.

Noticification of Reexamination regarding Chinese Patent Application No. 200610059644.3, dated Jul. 2, 2010 from the Patent Reexamination Board of the State Intellectual Property Office of the People's Republic of China. Translation prepared by Unitalen Attorneys at Law.

\* cited by examiner

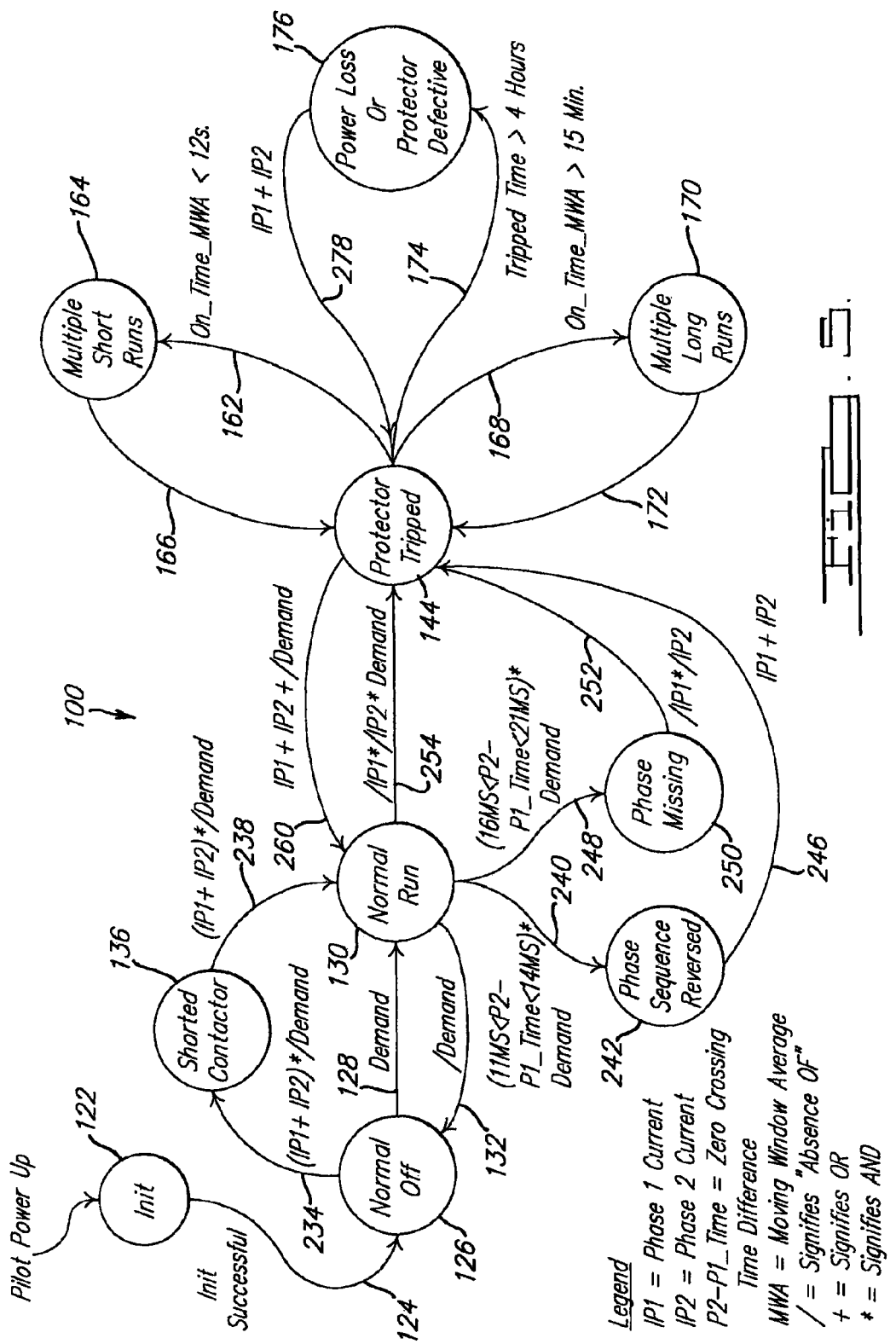

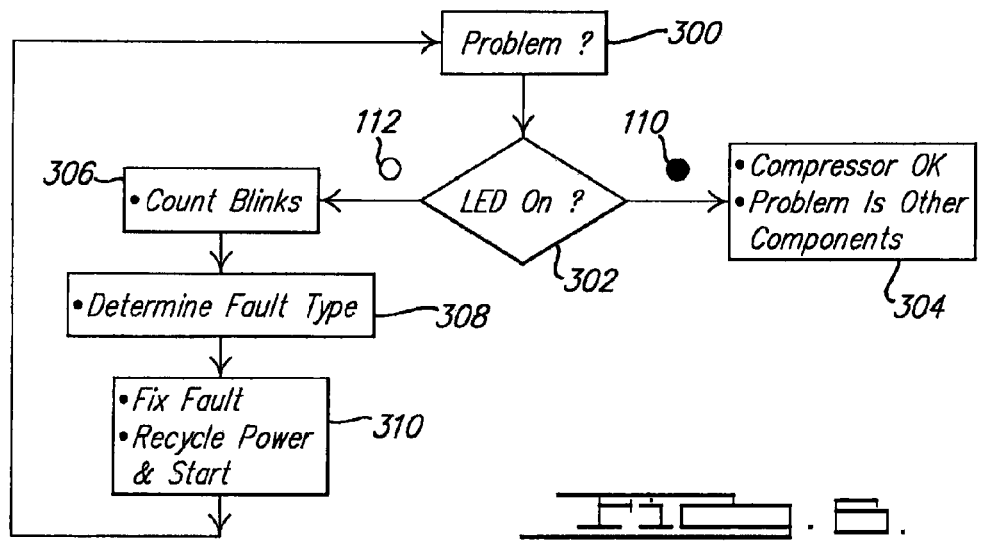
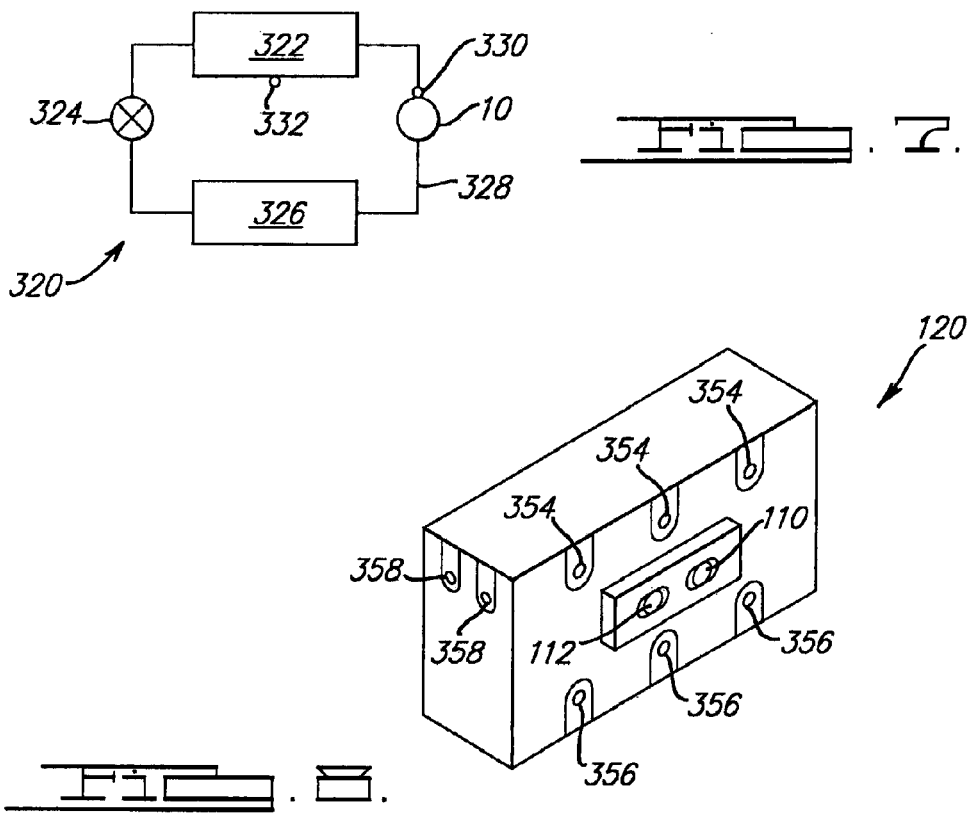

COMPRESSOR DIAGNOSTIC SYSTEM

CROSS-REFERENCE TO RELATED APPLICATION

This application is a continuation of U.S. patent application Ser. No. 10/776,856 filed on Feb. 11, 2004, which is a continuation of U.S. patent application Ser. No. 09/990,566 filed on Nov. 21, 2001 (now U.S. Pat. No. 6,758,050), which is a continuation-in-part application of U.S. patent application Ser. No. 09/818,271 filed on Mar. 27, 2001 (now U.S. Pat. No. 6,615,594). The disclosures of the above applications are incorporated herein by reference.

FIELD OF THE INVENTION

The present invention relates to a diagnostic system for a refrigeration or air-conditioning system. More particularly, the present invention relates to a diagnostic system for a refrigeration or air-conditioning system which uses various operating characteristics and the compressor's "trip" information to diagnose the problems associated with the refrigeration or air-conditioning system.

BACKGROUND AND SUMMARY OF THE INVENTION

A system includes logic circuitry in communication with an intelligent device, the logic circuitry processing a refrigeration system operating parameter as a function of time, at least one of the logic circuitry and the intelligent device diagnosing a refrigeration system status based on the processing, the intelligent device outputting the diagnosis.

A class of machines exists in the art generally known as scroll machines which are used for the displacement of various types of fluid. These scroll machines can be configured as an expander, a displacement engine, a pump, a compressor, etc., and the features of the present invention are applicable to any of these machines. For purposes of illustration, however, the disclosed embodiment is in the form of a hermetic refrigerant scroll compressor used within a refrigeration or air conditioning system.

Scroll compressors are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft affixed to the motor rotor. In a hermetic compressor, the bottom of the hermetic shell normally contains an oil sump for lubricating and cooling purposes. While the diagnostic system of the present invention will be described in conjunction with a scroll compressor, it is to be understood that the diagnostic system of the present invention can be used with other types of compressors also.

Traditionally, when an air conditioning or refrigeration system is not performing as designed, a technician is called to the site for trouble shooting the problem. The technician performs a series of checks that assists in isolating the problem with the system. One of the causes of the system's problem could be the compressor used in the system. A faulty compressor exhibits some operational patterns that could be used to detect the fact that the compressor is faulty. Unfortunately, many other causes for system problems can be attributed to other components in the system and these other causes can also affect the performance of the compressor and its operational pattern. It is possible to analyze the system's problems and operational patterns and determine that the compressor is faulty when in fact the problem lies elsewhere and the compressor is not the problem. This confusion of causes usually results in the replacement of a good compressor. This error in diagnosis is costly since the compressor is generally the most expensive component in the system. Further aggravating the problem is that the root cause for the system's problem has not been solved and the problem recurs in time. Any tool which can help avoid the misdiagnosing of the system's problem as described above would prove both useful and cost effective. The present invention discloses a device that increases the accuracy of the problem diagnosis for an air conditioning or refrigeration system.

A large part of the compressors used in air conditioning and refrigeration systems have built-in protection devices called "internal line break protectors". These protectors are thermally sensitive devices which are wired in electrical series with the motor. The protectors react thermally to the line current drawn by the motor and also other temperatures within the compressor including but not limited to discharge gas temperature, suction gas temperature or temperature of a particular component in the compressor. When one of these temperatures exceeds a designed threshold, the protector will open the electrical connection to the motor. This shuts down the motor operating the compressor which in turn shuts down the compressor and prevents it from operating in regions that would lead to its failure. After a period of time, when the temperatures have fallen to safe levels, the protector automatically resets itself and the compressor operates again. The temperatures that the protector is reacting to are a result of the operation of the compressor and the entire refrigeration or air-conditioning system. Either the operation of the compressor or the operation of the entire system can influence the temperatures sensed by these protectors. The significant aspect of the protection system is that some categories of faults repeatedly trip the protector with very short compressor ON time and other categories of faults trip the protector less frequently thus providing relatively longer compressor ON times. For example, a compressor with seized bearings would trip the protector within about twenty seconds or less of ON time. On the other hand, a system that has a very low refrigerant charge will trip the protector after typically more than ninety minutes of ON time. An analysis of the trip frequency, trip reset times and compressor ON times will provide valuable clues in identifying the cause of the system's problems.

The present invention provides a device which is based on this principle. The device of the present invention continuously records the status of the protector (open or closed) as a function of time and then it analyzes this status information to determine a faulty situation. The device goes further and isolates the fault to either the compressor or to the rest of the system. Once the fault has been isolated, the device will activate a visual indicator (light) and it will also send an electrical signal to any intelligent device (controller, computer, etc.) advising about the situation. The technician, on arriving at the scene, then has a clear indication that the problem is most likely in the system components other than the compressor or the problem is most likely in the compressor. He can then focus his further trouble shooting to the identified area. The device thus avoids the previously described situation of a confused diagnosis and the potential of mistakenly replacing a good compressor.

In addition to the status of the protector, additional information can be gathered by sensors that monitor other operating characteristics of the refrigeration system such as supply voltage and outdoor ambient temperature. This additional information can then be used to further diagnose the problems associated with the refrigeration or air-conditioning system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a flow diagram of the diagnostic system for the three phase motor for the compressor in accordance with the present invention;

FIG. 6 is a flow diagram which is followed when diagnosing a compressor system;

FIG. 7 is a schematic view of a typical refrigeration system utilizing the compressor and diagnostic system in accordance with the present invention;

FIG. 8 is a perspective view of a contactor integrated with the diagnostic system's circuitry in accordance with another embodiment of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
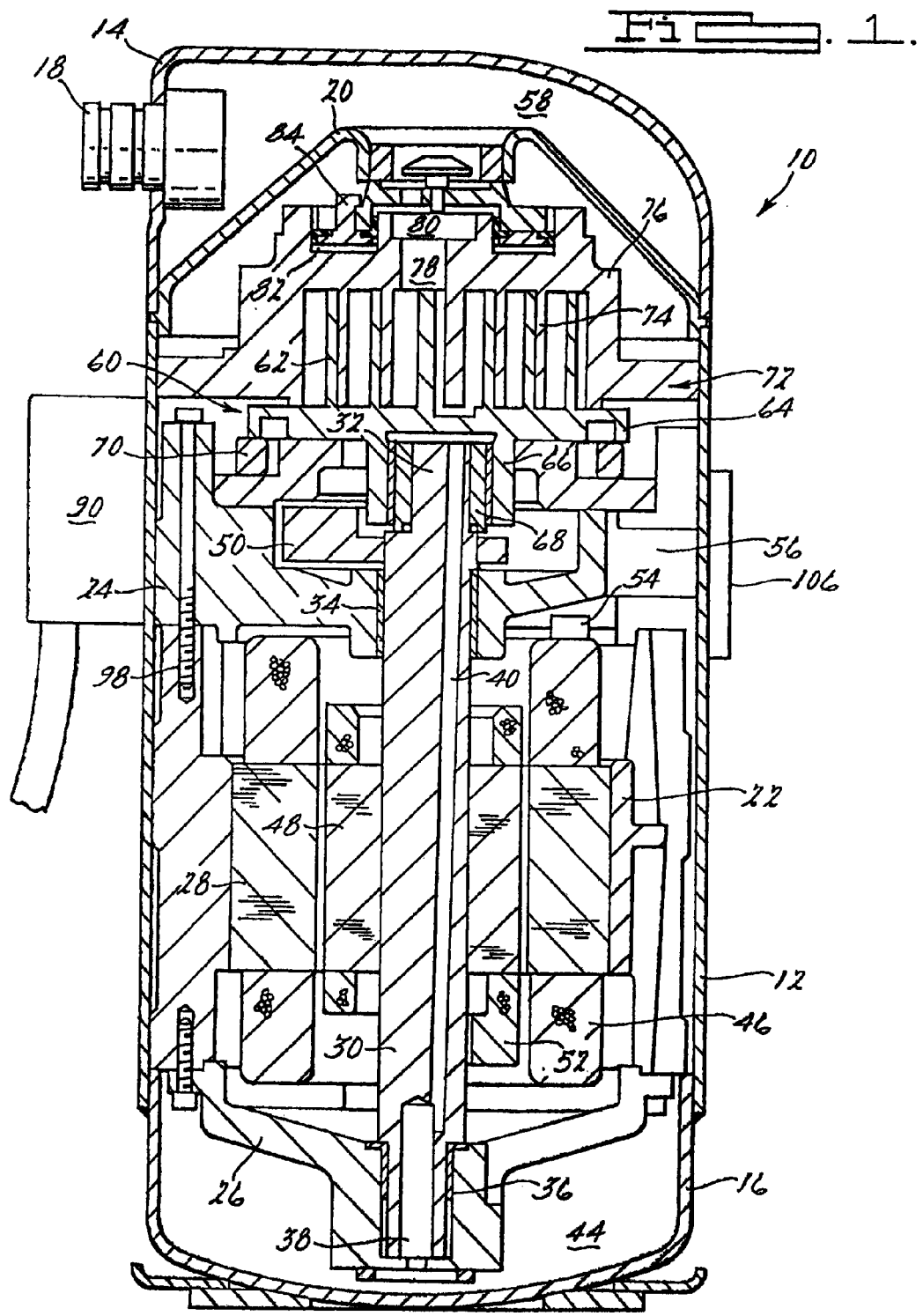
FIG. 1 is a vertical cross section of a hermetic scroll compressor incorporating the unique compressor diagnostic system in accordance with the present invention.

Referring now to the drawings in which like reference numerals designate like or corresponding parts throughout the several views, there is shown in FIG. 1 a scroll compressor incorporating the unique compressor diagnostic system in accordance with the present invention and which is designated generally by the reference numeral 10. While compressor 10 is being illustrated as a scroll compressor in conjunction with a refrigeration or air conditioning system, it is within the scope of the present invention to utilize other types of compressors in the refrigeration or air conditioning system if desired as well as having any of the compressor designs being in conjunction with other types of systems.

Scroll compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein. A transversely extending partition 20 is affixed to shell 12 by being welded about is periphery at the same point that cap 14 is welded to shell 12. A compressor mounting frame 22 is press fit within shell 12 and it is supported by the end of base 16. Base 16 is slightly smaller in diameter than shell 12 such that base 16 is received within shell 12 and welded about its periphery as shown in FIG. 1.

Major elements of compressor 10 that are affixed to frame 22 include a two-piece main bearing housing assembly 24, a lower bearing housing 26 and a motor stator 28. A drive shaft or crankshaft 30 having an eccentric crank pin 32 at the upper end thereof is rotatably journaled in a bearing 34 secured within main bearing housing assembly 24 and a second bearing 36 secured within lower bearing housing 26. Crankshaft 30 has at the lower end thereof a relatively large diameter concentric bore 38 which communicates with a radially outwardly positioned smaller diameter bore 40 extending upwardly therefrom to the top of crankshaft 30. The lower portion of the interior of shell 12 defines an oil sump 44 which is filled with lubricating oil to a level slightly above the lower end of a rotor, and bore 38 acts as a pump to pump lubricating fluid up crankshaft 30 and into bore 40 and ultimately to all of the various portions of compressor 10 which require lubrication.

Crankshaft 30 is rotatably driven by an electric motor which includes stator 28, windings 46 passing therethrough and a rotor 48 press fitted into crankshaft 30. An upper counterweight 50 is secured to crankshaft 30 and a lower counterweight 52 is secured to rotor 48. A temperature protector 54, of the usual type, is provided in close proximity to motor windings 46. Temperature protector 54 will de-energize the motor if thermal protector 54 exceeds its normal temperature range. Temperature protector 54 can be heated by motor windings 46, suction gas within a suction chamber 56 and/or discharge gas within a discharge chamber 58 which is released into suction chamber 56. Both suction chamber 56 and discharge chamber 58 are defined by shell 12, cap 14, base 16 and partition 22 as shown in FIG. 1.

The upper surface of two-piece main bearing housing assembly 24 is provided with a flat thrust bearing surface on which is disposed an orbiting scroll member 60 having the usual spiral vane or wrap 62 extending upward from an end plate 64. Projecting downwardly from the lower surface of end plate 64 of orbiting scroll member 60 is a cylindrical hub 66 having a journal bearing therein and which is rotatably disposed a drive bushing 68 having an inner bore in which crank pin 32 is drivingly disposed. Crank pin 32 has a flat on one surface which drivingly engages a flat surface formed in a portion of the inner bore of drive bushing 68 to provide a radially compliant driving arrangement, such as shown in Assignee's U.S. Pat. No. 4,877,382, the disclosure of which is hereby incorporated herein by reference. An Oldham coupling 70 is also provided positioned between orbiting scroll member 60 and two-piece bearing housing assembly 24. Oldham coupling 70 is keyed to orbiting scroll member 60 and to a non-orbiting scroll member 72 to prevent rotational movement of orbiting scroll member 60.

Non-orbiting scroll member 72 is also provided with a wrap 74 extending downwardly from an end plate 76 which is positioned in meshing engagement with wrap 62 of orbiting scroll member 60. Non-orbiting scroll member 72 has a centrally disposed discharge passage 78 which communicates with an upwardly open recess 80 which is in turn in communication with discharge chamber 58. An annular recess 82 is also formed in non-orbiting scroll member 72 within which is disposed a floating seal assembly 84.

Recesses 80 and 82 and floating seal assembly 84 cooperate to define axial pressure biasing chambers which receive pressurized fluid being compressed by wraps 62 and 74 so as to exert an axial biasing force on non-orbiting scroll member 72 to thereby urge the tips of respective wraps 62 and 74 into sealing engagement with the opposed end surfaces of end plates 76 and 64, respectively. Floating seal assembly is preferably of the type described in greater detail in Assignee's U.S. Pat. No. 5,156,639, the disclosure of which is hereby incorporated herein by reference. Non-orbiting scroll member 72 is designed to be mounted for limited axial movement with respect to two-piece main bearing housing assembly 24 in a suitable manner such as disclosed in the aforementioned U.S. Pat. No. 4,877,382 or Assignee's U.S. Pat. No. 5,102,316, the disclosure of which is hereby incorporated herein by reference.

Compressor 10 is powered by electricity which is provided to the electric motor within shell 12 through a molded electric plug 90.

Figure 2:
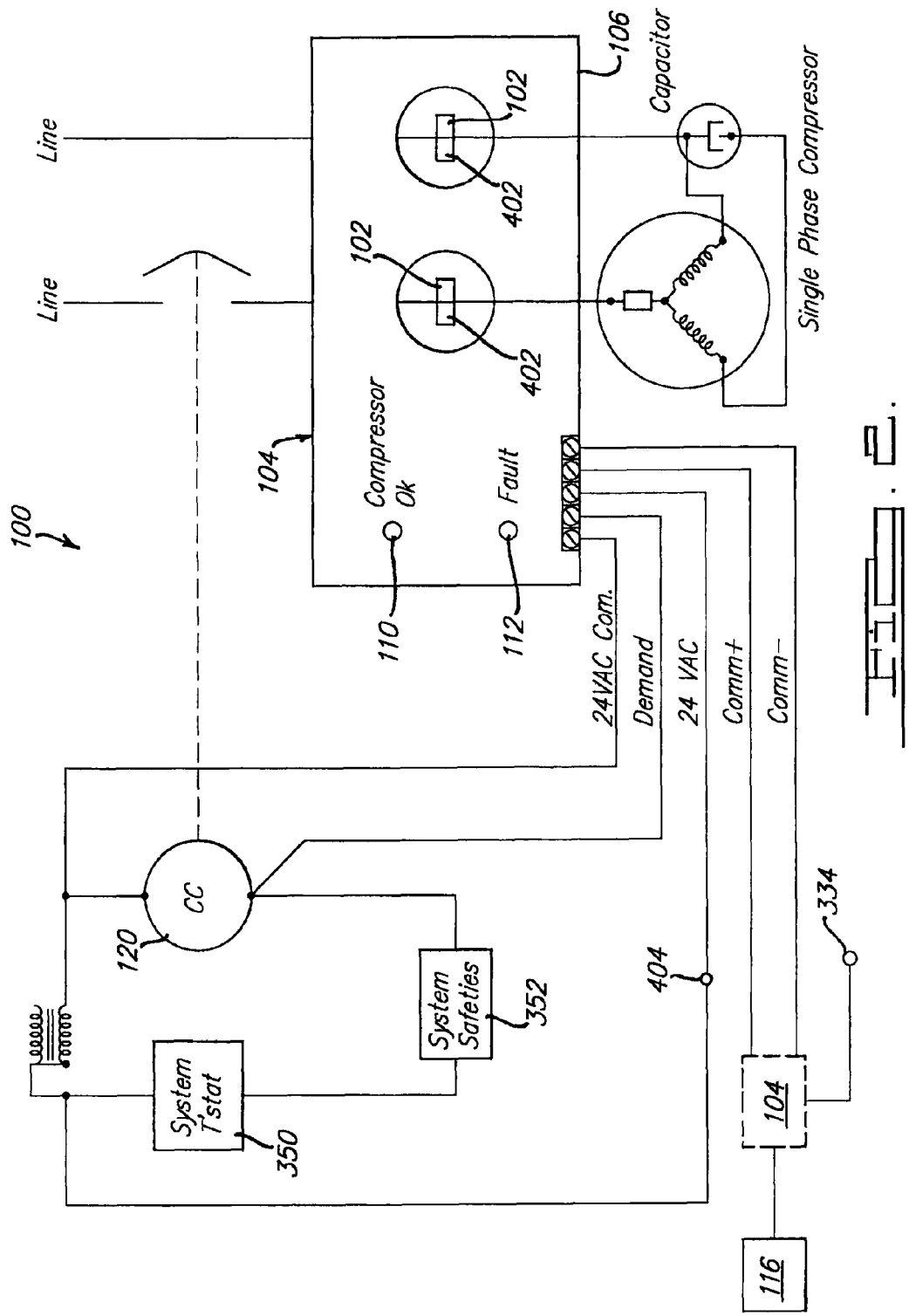
FIG. 2 is a schematic representation of the diagnostic system for a single phase motor for the compressor in accordance with the present invention.
Figure 3:
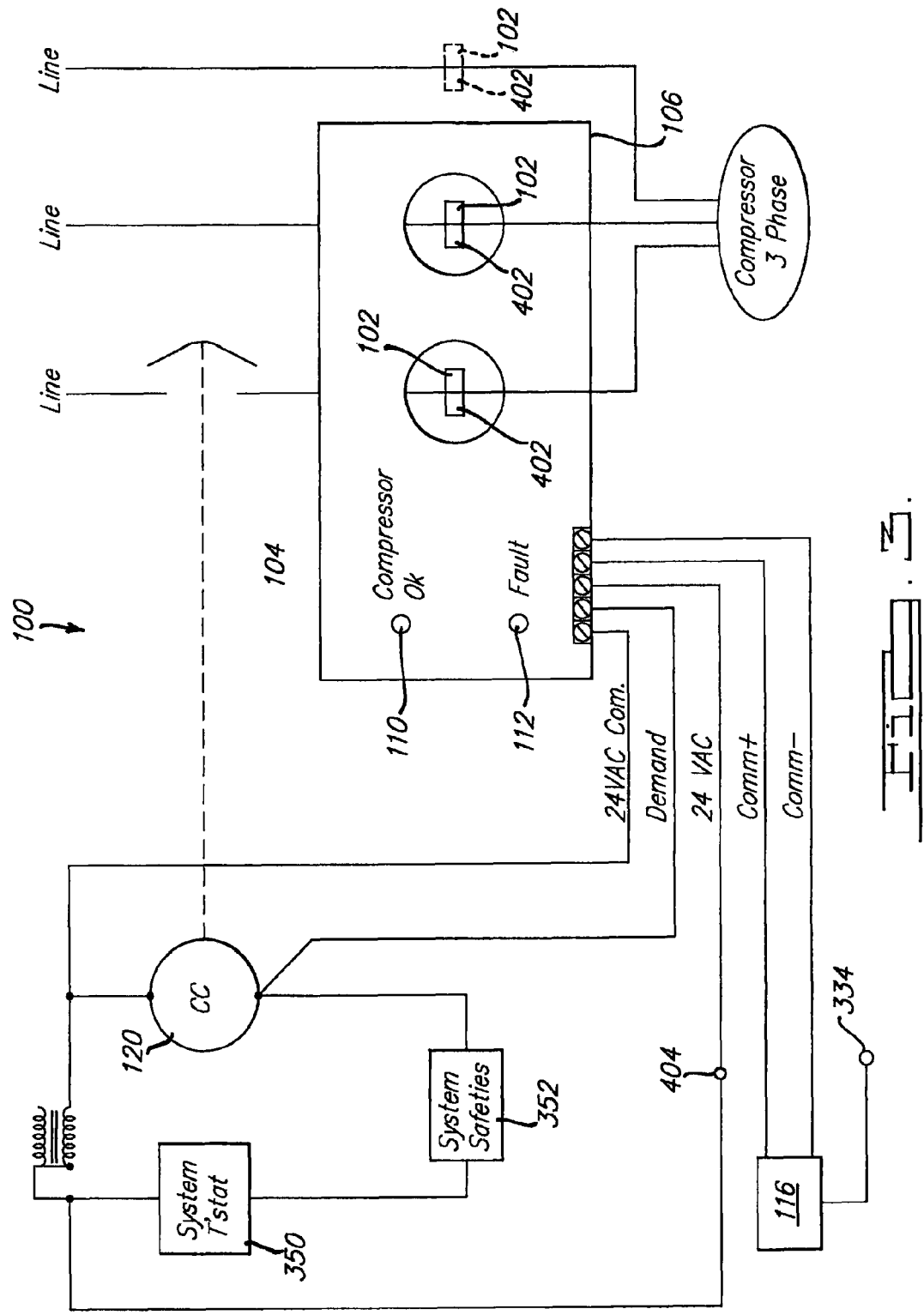
FIG. 3 is a schematic representation of a diagnostic system for a three phase motor for the compressor in accordance with another embodiment of the present invention.

Referring now to FIGS. 1 through 3, the present invention is directed to a unique compressor diagnostic system 100. Diagnostic system 100 comprises one or more current sensing devices 102 and the associated logic circuitry 104. Current sensing devices 102 are mounted in a housing 106 mounted externally to shell 12. Logic circuitry 104 can be mounted in housing 106 or it can be located in a convenient position with respect to compressor 10 as shown in phantom in FIG. 2. Optionally, the sensing device and circuitry can be integrated into a special contactor, a special wiring harness or into a molded plug utilized for some compressor designs.

Current sensing devices 102 sense the current in the power supply wires powering compressor 10. FIG. 2 illustrates two current sensing devices 102 in conjunction with a single-phase motor. One of the current sensing devices 102 is associated with the main windings for the compressor motor and the other current sensing device 102 is associated with the auxiliary windings for the compressor motor. FIG. 3 also illustrates two current sensing devices 102 in conjunction with a three phase motor. Each current sensing device 102 is associated with one of the phases of the three phase power supply. While FIG. 3 illustrates two current sensing devices sensing current in two phases of the three phase power supply, it is within the scope of the present invention to include a third current sensor 102 to sense the current in the third phase of the three phase power supply as shown in phantom in FIG. 3 if desired. These current signals represent an indication of the status of protector 54 (open or closed). While current sensing devices 102 sense the status of protector 54 utilizing the current in the power supply wires, it is also possible to sense the status of protector 54 by sensing the presence or absence of voltage on the motor side of protector 54. The inventors of the present invention consider this to be a less desirable but effective approach in some cases because it requires an additional hermetic feed-through pin extending through shell 12. The signals received from current sensing devices 102 are combined in logic circuitry 104 with the demand signal for compressor 10. The demand signal for compressor 10 is acquired by sensing the presence of supply voltage or by having a system controller (not shown) supply a discrete signal representing the demand. The demand signal and the signal received by logic circuitry 104 are processed by logic circuitry 104 to derive the information about the trip frequency of protector 54 and the average ON time and OFF time of compressor 10. Logic circuitry 104 analyses the combination of current signals, the demand signal and the derived protector trip frequencies to determine if a fault condition exists. Logic circuitry also has the unique capability of identifying a specific cause based on some faults. This information is provided to the service people using a green LED light 110 and a yellow LED light 112. Green LED light 110 is utilized to indicate that there is currently no fault condition and that the system is functioning normally.

Yellow LED light 112 is utilized to indicate the presence of a fault. When yellow LED light 112 is turned ON, green LED light 110 is turned OFF. Thus, yellow LED light 112 is utilized to visually communicate that there is a fault as well as indicating the type of fault that is present. This communication is accomplished by turning yellow LED light 112 ON and then OFF for a specific duration and sequence to indicate both that there is a fault and to identify what the fault is. For example, turning light 112 ON for one second and turning it OFF for nineteen seconds and repeating this sequence every twenty seconds will create the effect of a blinking light that blinks ON once every twenty seconds. This sequence corresponds to a type of fault that is coded as a type 1 fault. If light 112 is blinked ON twice for one second during the twenty second window, it is an indication that a fault that is coded as a type 2 is present. This sequence continues to indicate a type 3, a type 4 and so on with the type of fault being indicated by the number of blinks of light 112. This scheme of the blinking of light 112 for a specific number of times is employed to visually communicate to the technician the various types of faults detected by logic circuitry 104. While the present invention utilizes blinking light 112 to convey the fault codes, it is within the scope of the present invention to utilize a plurality of lights to increase the effectiveness of conveying a large number of fault codes if desired. In addition, other methods of providing the default code, including providing a coded voltage output that can be interfaced with other electronic devices, can also be employed.

In addition to visually communicating the specific fault code using light 112, logic circuitry 104 also outputs a coded sequence of electrical pulses to other intelligent controllers that may exist in the system. These coded pulses represent the type of fault that has been detected by diagnostic system 100. The types of faults which can be detected by logic circuitry 104 include, but are not limited to:
1. Protector has "tripped".
2. The auxiliary winding of a single phase motor has no power or is open or has a faulty run capacitor.
3. The main winding of a single phase motor has no power or that the winding is open.
4. The main circuit breaker has contacts that have welded shut.
5. One of the phases in a 3 phase circuit is missing.
6. The phase sequence in a 3 phase system is reversed.
7. The supply voltage is very low.
8. The rotor inside the compressor has seized.
9. The protector is tripping due to system high pressure side refrigeration circuit problems.

10. The protector is tripping due to system lower pressure side refrigeration circuit problems.
11. The motor windings are open or the internal line break protector is faulty.
12. The supply voltage to the compressor is low.

As a variation to the above, as shown in FIG. 3, diagnostic system 100 may only send the status of protector 54 to an intelligent device 116. In this option, the parameters of trip frequencies, ON times and OFF times with the diagnosis information may be generated at intelligent device 116. Intelligent device 116 can be a compressor controller associated with compressor 10, it can be a system controller monitoring a plurality of compressors 10, it can be a remotely located device or it can be any other device which is selected to monitor diagnostic system 100 of one or more compressors.

Figure 4:
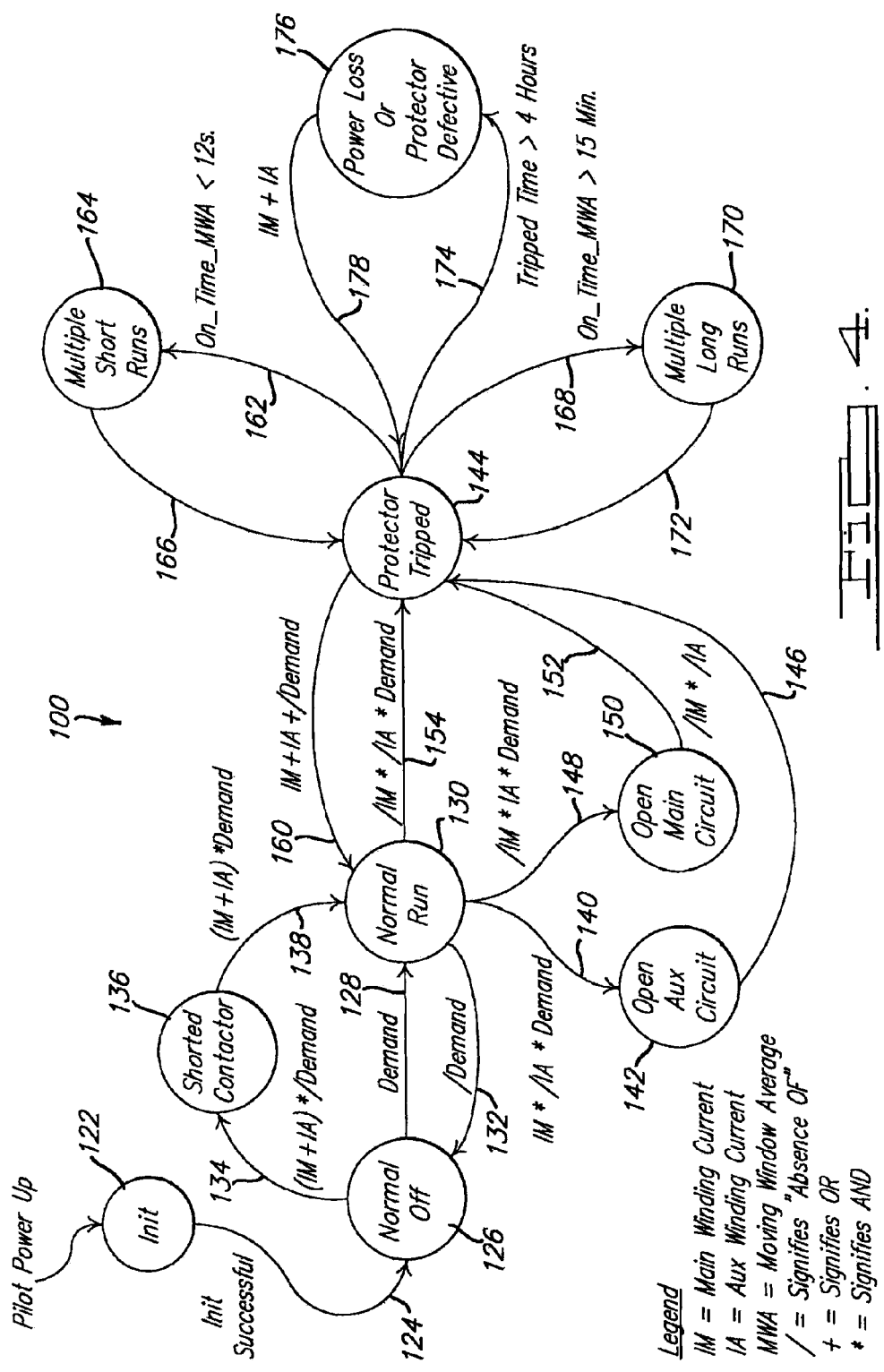
FIG. 4 is a flow diagram of the diagnostic system for the single phase motor for the compressor in accordance with the present invention.

FIG. 4 represents a flow diagram for diagnostic system 100 in conjunction with a single phase compressor. The demand signal is provided to logic circuitry 104 from a device or a contactor 120 (FIGS. 2 and 3) along with the current signal from sensing devices 102. When the system is initially powered up, an initializing process is performed at 122 and, if successful, the system, as shown by arrow 124, goes to a normal OFF condition as shown at 126. When sitting at the normal OFF condition 126, if a demand signal is provided to the system, the system moves as shown by arrow 128 to a normal run condition shown at 130. Once the demand has been met, the system returns to the normal OFF condition 126 as shown by arrow 132.

While sitting at the normal OFF condition 126, if current in the main winding or current in the auxiliary winding is detected and there has been no demand signal, the system moves as shown by arrow 134 to a shorted contactor condition 136. While indicating the shortened contactor condition 136, if the demand is signaled, the system moves as shown by arrow 138 to the normal run condition 130. The normal run condition 130 continues until the demand has been satisfied where the system moves as shown by arrow 132 back to the normal OFF condition 126 which may again move to the shortened contactor condition 136 depending on whether or not current is sensed in the main or auxiliary windings.

While operating in the normal run condition 130, one of three paths other than returning to the normal OFF condition 126 can be followed. First, if the system senses demand and main winding current but does not sense auxiliary winding current, the system moves as shown by arrow 140 to an open auxiliary circuit condition 142. From here, the system moves to a protector tripped condition 144 as shown by arrow 146 when both a main winding current and an auxiliary winding current are not sensed. Second, if the system senses demand and auxiliary winding current but does not sense main winding current, the system moves as shown by arrow 148 to an open main circuit condition 150. From here, the system moves to the protector tripped condition 144 as shown by arrow 152 when both a main winding current and an auxiliary winding current are not sensed. Third, if the system senses demand and does not sense auxiliary winding current and main winding current, the system moves as shown by arrow 154 to the protector tripped condition 144.

While operating in the protector tripped condition 144, one of four paths can be followed. First, if main winding current or auxiliary winding current is sensed and the demand is satisfied, the system moves as shown by arrow 160 to the normal run condition 130. Second, with the protector tripped, and the moving window average of the ON time of the system has been less than twelve seconds, the system moves as shown by arrow 162 to a multiple short run condition 164. From the multiple short run condition, the system moves back to the protector tripped condition 144 as shown by arrow 166. Third, with the protector tripped, and the moving window average of the ON time of the system has been greater than fifteen minutes, the system moves as shown by arrow 168 to a multiple long run condition 170. The system moves back to the protector tripped condition 144 as shown by arrow 172. Fourth, with the protector tripped, if the tripped time exceeds four hours, the system moves as shown by arrow 174 to a power loss or protector defective condition 176. If, while the system is in the power loss or protector defective condition 176 and main winding current or auxiliary winding current is sensed, the system moves back to the protector tripped condition 144 as shown by arrow 178.

When the system moves to the various positions shown in FIG. 4, the blinking of light 112 is dictated by the fault condition sensed. In the preferred embodiment, if a protector tripped condition is sensed at 154 because demand is present but current is missing, light 112 blinks once. If compressor 10 is seized or there is a low supply voltage problem such as indicated by arrow 162 because the average ON time during the last five trips was less than twelve seconds, light 112 blinks twice. If the motor windings are open, the protector is faulty or the contactor is faulty as indicated by arrow 174 because the OFF time is greater than four hours, light 112 blinks three times. If the auxiliary windings are open or there is a faulty run capacitor as indicated by arrow 140, light 112 blinks four times. If the main winding is open as indicated by arrow 148, light 112 blinks five times. If the contactor is welded as indicated by arrow 134 because current is sensed but there is no demand, light 112 blinks six times. Finally, if there are repeated protector trips due to other system problems as indicated by arrow 168 because the average ON time during the last five trips was less than fifteen minutes, light 112 blinks seven times.

FIG. 5 represents a flow diagram for diagnostic system 100 in conjunction with a three phase compressor. The demand signal is provided to logic circuitry 104 from contactor 120 (FIGS. 2 and 3) along with the current signal from sensing devices 102. When the system is initially powered up, an initializing process is performed at 122 and, if successful, the system, as shown by arrow 124, goes to a normal OFF condition as shown at 126. When sitting at the normal OFF condition 126, if a demand signal is provided to the system, the system moves as shown by arrow 128 to a normal run condition shown at 130. Once the demand has been met, the system returns to the normal OFF condition 126 as shown by arrow 132.

While sitting at the normal OFF condition 126, if current in one of the three phases or current in a second of the three phases is detected and there has been no demand signal the system moves as shown by arrow 234 to a shorted contactor condition 136. While indicating the shortened contactor condition 136, if the demand is signaled, the system moves as shown by arrow 238 to the normal run condition 130. The normal run condition 130 continues until the demand has been satisfied where the system moves as shown by arrow 132 back to the normal OFF condition 126 which may again move to the shortened contactor condition 136 depending on whether or not current is sensed in the main or auxiliary windings.

While operating in the normal run condition 130, one of three paths other than returning to the normal OFF condition 126 can be followed. First, if the system senses demand and eleven milliseconds is less than the zero crossing time difference between the first and second phases of the three phase power supply or this time difference is less than fourteen milliseconds, the system moves as shown by arrow 240 to a phase sequence reversed condition 242. From here, the system moves to a protector tripped condition 144 as shown by arrow 246 when both a first phase current or a second phase current is not sensed. Second, if the system senses demand and sixteen milliseconds is less than the zero crossing time difference between the first and second phases or this time difference is less than twenty-one milliseconds, the system moves as shown by arrow 248 to a phase missing condition 250. From here, the system moves to the protector tripped condition 144 as shown by arrow 252 when both a first phase current and a second phase current are not sensed. Third, if the system senses demand and does not sense first phase current and second phase current, the system moves as shown by arrow 254 to the protector tripped condition 144.

While operating in the protector tripped condition 144, one of four paths can be followed. First, if first phase current or second phase current is sensed and the demand is satisfied, the system moves as shown by arrow 260 to the normal run condition 130. Second, with the protector tripped, and the moving window average of the ON time of the system has been less than twelve seconds, the system moves as shown by arrow 162 to a multiple short run condition 164. From the multiple short run condition, the system moves back to the protector tripped condition 144 as shown by arrow 166. Third, with the protector tripped, and the moving window average of the ON time of the system has been greater than fifteen minutes, the system moves as shown by arrow 168 to a multiple long run condition 170. The system moves back to the protector tripped condition 144 as shown by arrow 172. Fourth, with the protector tripped, if the tripped time exceeds four hours, the system moves as shown by arrow 174 to a power loss or protector defective condition 176. If, while the system is in the power loss or protector defective condition 176 and first phase current or second phase current is sensed, the system moves back to the protector tripped condition 144 as shown by arrow 278.

When the system moves to the various positions shown in FIG. 5, the blinking of light 112 is dictated by the fault condition sensed. In the preferred embodiment, if a protector tripped condition is sensed at 254 because demand is present but current is missing, light 112 blinks once. If compressor 10 is seized or there is a low supply voltage problem such as indicated by arrow 162 because the average ON time during the last five trips was less than twelve seconds, light 112 blinks twice. If the motor windings are open, the protector is faulty or the contactor is faulty as indicated by arrow 174 because the OFF time is greater than four hours, light 112 blinks three times. If the contactor is welded as indicated by arrow 234 because current is sensed but there is no demand, light 112 blinks four times. If there are repeated protector trips due to other system problems as indicated by arrow 168 because the average ON time during the last five trips was less than fifteen minutes, light 112 blinks five times. If the power supply phases are reversed as indicated by arrow 240 because the zero crossing time difference is between eleven and fourteen milliseconds, light 112 blinks six times. Finally, if there is a phase missing in the three phase power supply as indicated by arrow 248 because the zero crossing time difference is between sixteen and twenty-one milliseconds, light 112 blinks seven times.

While the above technique has been described as monitoring the moving window averages for compressor 10, it is within the scope of the present invention to have logic circuitry 104 utilize a real time or the instantaneous conditions for compressor 10. For instance, in looking at arrows 162 or 168, rather than looking at the moving window average, logic circuitry 104 could look at the previous run time for compressor 10.

FIG. 6 represents a flow diagram which is followed when diagnosing a system problem. At step 300, the technician determines if there is a problem by checking the LEDs at step 302. If green LED 110 is lit, the indication at 304 is that compressor 10 is functioning normally and the problem is with other components. If yellow LED light 112 is blinking, the technician counts the number of blinks at 306. Based upon the number of blinks of light 112 the determination of the failure type is made at 308. The fault is corrected and the system is recycled and started at 310. The system returns to step 300 which again will indicate any faults with compressor 10.

Thus, diagnostic system 100 provides the technician who arrives at the scene with a clear indication of most likely where the problem with the system is present. The technician can then direct his attention to the most likely cause of the problem and possibly avoid the replacement of a good compressor.

FIG. 7 illustrates a typical refrigeration system 320. Refrigeration system 320 includes compressor 10 in communication with a condensor 322 which is in communication with an expansion device 324 which is in communication with an evaporator 326 which is in communication with compressor 10. Refrigerant tubing 328 connects the various components as shown in FIG. 7.

Referring now to FIG. 8, a contactor 120 is illustrated which incorporates diagnostic system 100 in the form of current sensors 102, logic circuitry 104, green LED light 110 and yellow light 112. Contactor 120 is designed to receive information from various system controls such as a system thermostat 350 (FIGS. 2 and 3), a group of system safeties 352 (FIGS. 2 and 3) and/or other sensors incorporated into the system and based upon three inputs provide power to compressor 10.

Figure 9:
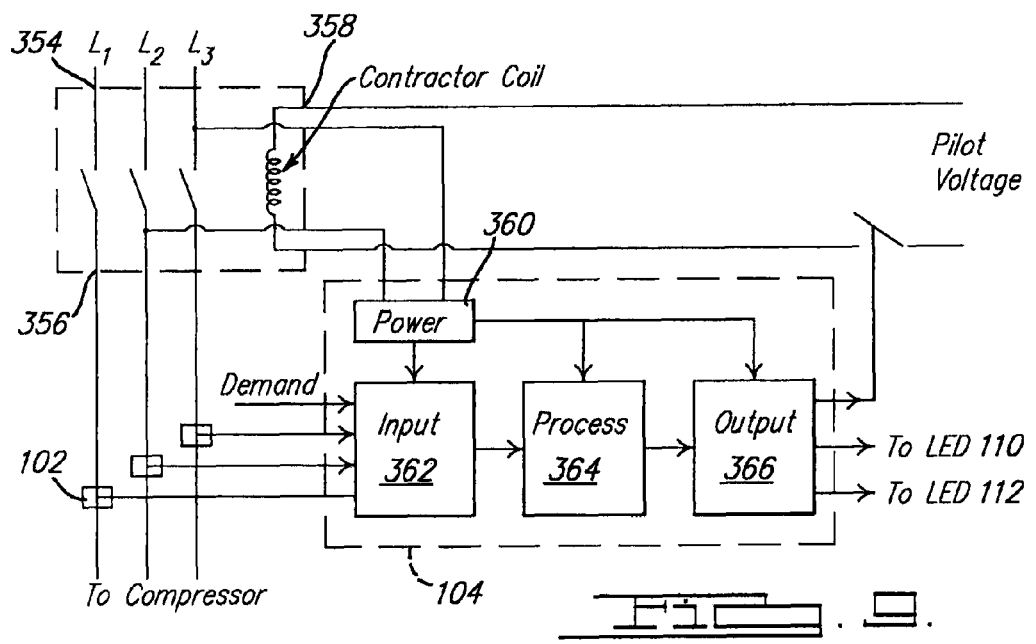
FIG. 9 is a schematic view illustrating the circuitry of the contactor illustrated in FIG. 8.

Contactor 120 includes a set of power-in connectors 354, a set of power-out connectors 356, a set of contactor coil connectors 358, light 110 and light 112. The internal schematic for contactor 120 is shown in FIG. 9. A power supply 360 receives power from connectors 354, converts the input power as needed and then supplies the required power to input circuitry 362, processing circuitry 364 and output circuitry 366, which collectively form logic circuitry 104.

Input circuitry 362 receives the input from current sensors 102 and the demand signal in order to diagnose the health of compressor 10. The information received by input circuitry 362 is directed to processing circuitry 364 which analyses the information provided and then provides information to output circuitry 366 to operate compressor 10 and/or activate LED lights 110 and 112. The incorporation of logic circuitry 104 into contactor 120 simplifies the system due to the fact that both the line power and the demand signal are already provided to contactor 120. The function and operation of diagnostic system 100 incorporated into contactor 120 is the same as described above for housing 106.

Figure 10:
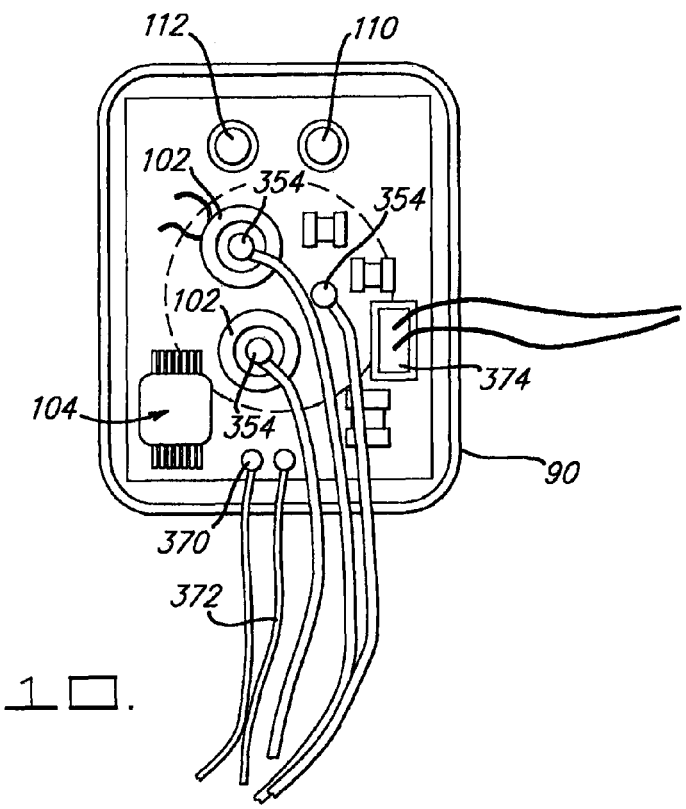
FIG. 10 is a schematic view of a compressor plug which illustrates the diagnostic system's circuitry in accordance with another embodiment of the present invention.

Referring now to FIG. 10, molded plug 90 is illustrated incorporating diagnostic system 100 in the form of current sensors 102, logic circuitry 104, light 110 and light 112. In some applications, incorporation of diagnostic system 100 into molded plug 90 offers some distinct advantages. When diagnostic system 100 is incorporated into molded plug 90, power is provided through connectors 354 and must also be provided to diagnostic system from the input power or it can be provided separately through connector 370. In addition, the demand signal must also be provided to plug 90 and this can be done through connectors 372. The function and operation of diagnostic system 100 incorporated into molded plug 90 is the same as described above for housing 106. Communication from plug 90 is accomplished through connection 374.

FIGS. 4 and 5 illustrate flow diagrams for diagnostic system 100. While operating in the protector tripped condition 144, different paths are followed depending upon the moving window average of the ON time or the previous cycle ON time. These various paths help to determine what type of fault is present.

Figure 11:
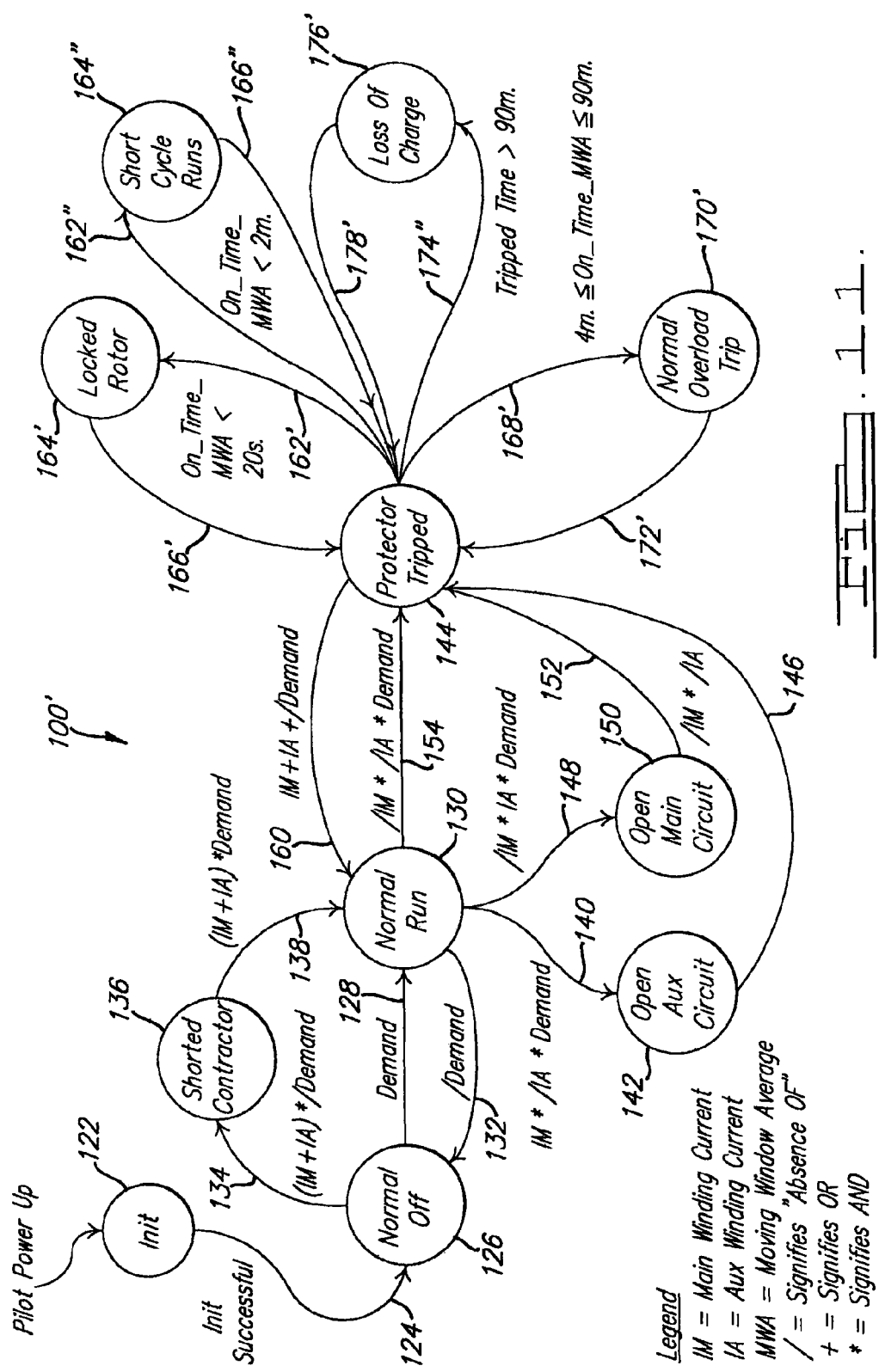
FIG. 11 is a flow diagram of a diagnostic system for the compressor in accordance with another embodiment of the present invention.

This concept can be expanded by making additional assumptions based upon the compressor ON time between overload trips. The compressor ON time duration prior to the overload trip can be expanded to be useful in diagnosing whether the fault is likely located on the high-side (condenser) or on the low-side (evaporator) of the refrigeration or air conditioning system. This added information would help the technician speed up his search for the fault. FIG. 11 illustrates the flow diagram for a diagnostic system 100. While FIG. 11 illustrates a diagnostic system for a single phase motor, the diagnostic system illustrated in FIG. 11 and described below can be utilized with a three phase motor, if desired.

Figure 12:
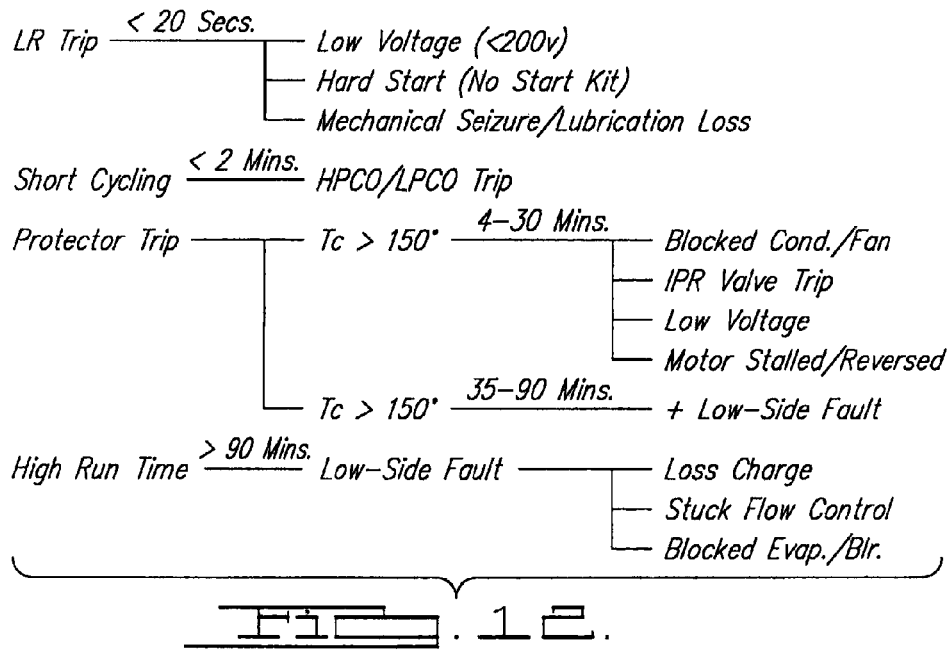
FIG. 12 is a chart indicating the possible system faults based upon ON time before trips.

Using this approach, there are four major system faults as shown in FIG. 12 that can be identified based on the ON time and/or OFF time. First, a "locked rotor" (LR Trip) condition typically results from a compressor mechanical lock-out or a hard start problem. This results in the shortest trip time usually within twenty seconds or less. This is illustrated in FIG. 11 by arrow 162' which leads to a locked rotor condition 164: from the locked rotor condition 164; the system moves back to the protector tripped condition 144 as shown by arrow 166'. Second, a "short cycling" condition is typically due to cut-in and cut-out of either the high-side or the low-side safety pressure switches. Both the ON time and OFF time during short cycling are typically in the order of two minutes or less. This is illustrated in FIG. 11 by arrow 162" which leads to a short cycling run condition 164". From the short cycling run condition 164", the system moves back to the protector tripped condition 144 as shown by arrow 166". Third, a "normal overload trip" (protector trip) condition is the one expected to occur most often imposing a max-load condition on the compressor due to system faults such as a blocked or failed condenser fan. The ON time between trips can be anywhere from four to ninety minutes depending on the severity of the faults. This is illustrated in FIG. 11 by arrow 168' which leads to a normal overload trip condition 170'. From the normal overload trip condition 170', the system moves back to the protector tripped condition 144 as shown by arrow 172'. As shown in FIG. 12, the normal overload trip can be broken down into two separate areas of the temperature if condenser 322 (Tc) is known. Fourth, a "high run time" fault condition results in very long run times typically greater than ninety minutes. A normal fifty per-cent run-time thermostat cycling based on a rate of three cycles per hour would produce an ON time of ten minutes. Thus, running more than ninety minutes is typically a fault. This is illustrated in FIG. 11 by arrow 174' which leads to a loss of charge fault 176'. From the loss of charge fault 176', the system moves back to the protector tripped condition 144 as shown by arrow 178'. Diagnostic system 100' can replace diagnostic system 100 shown in FIGS. 4 and 5 or diagnostic system 101' can run concurrently with these other two diagnostic systems.

Additional information can be obtained using additional sensors. By adding key sensors, the diagnostic systems described above can extend into a major capability that can clearly distinguish between a compressor fault and a system fault on any set or conditions.

Specifically, for a given voltage and power supply type, the running current for compressor 10 is mainly a prescribed function of its discharge pressure and its suction pressure as represented by typical published performance tables or equations. Typically, for most scroll compressors, the compressor current varies mainly with the discharge pressure and it is fairly insensitive to suction pressure. When a mechanical failure occurs inside scroll compressors, its current draw will increase significantly at the same discharge pressure. Therefore, by sensing current with current sensing devices 102 and by sensing discharge pressure using a sensor 330 as shown in FIG. 7, most faults inside compressor 10 can be detected. For a given power supply, a change in voltage can affect its current. However, these voltage changes are usually intermittent and not permanent, while a fault is typically permanent and irreversible. This difference can be distinguished by detecting the current with current sensing devices 102 and by detecting the discharge pressure with sensor 330 for several repetitive cycles.

Figure 13:
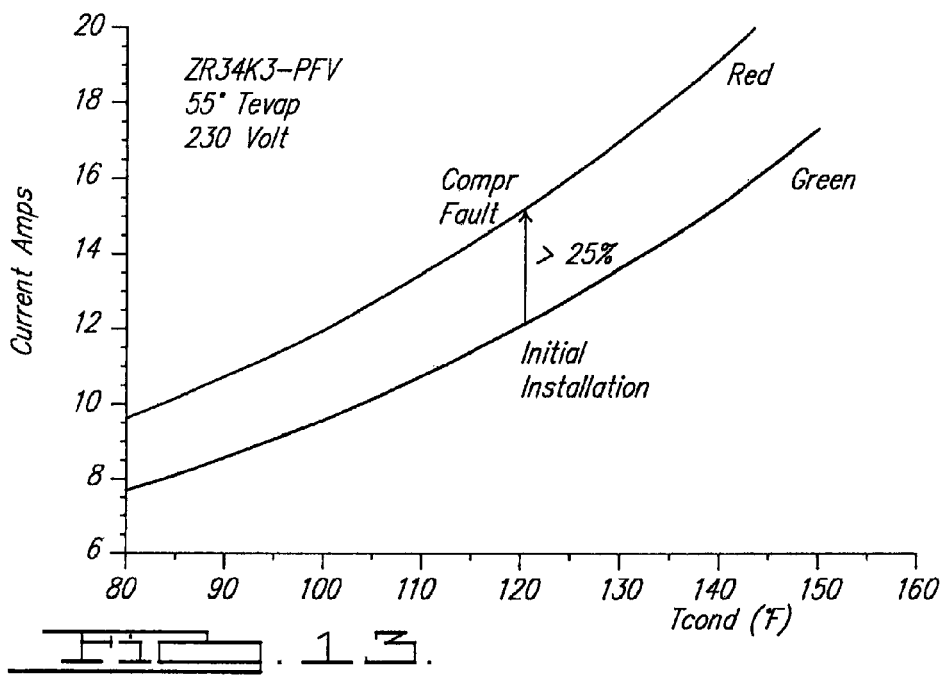
FIG. 13 is a graph showing electrical current versus the temperature of the condenser.

Typically, discharge pressure sensor 330 is a fairly expensive component, especially for residential system implementation. A low-cost alternative is to use a temperature sensor CR thermistor 332 as shown in FIG. 7 mounted at the midpoint of condenser 322 on one of the tube hairpin or return bends. This temperature sensing is fairly well known as it is used with demand-type defrost control for residential heat pumps. FIG. 13 illustrates a typical relationship between compressor current and condensing temperature. A generic equation or table for this relationship can be pre-programmed into diagnostic systems 100 or 100'. Then by measuring two or three coordinate points during the initial twenty-four hours of operation after the first clean installation, the curve can then be derived and calibrated to the system for use as a no-fault reference.

In addition to current sensing devices 102, pressure sensor 330 or temperature sensor 332, an outdoor ambient temperature sensor 334 as shown in FIGS. 2 and 3 may be added. The addition of sensor 334 is mainly for detecting compressor faults by leveraging the data from sensors 102 and 330 or 332 with the data from sensor 334. Since both temperature sensor 332 and temperature sensor 334 are typically used with demand-type defrost controls in residential heat pumps, this concept is fairly attractive because the technicians are already familiar with these sensors and the added cost is only incremental.

The combination of condensing temperature and condenser delta T (condensing temperature minus ambient temperature) now provides more powerful diagnostic capability of system faults as illustrated below including heat pumps in the heating mode because the delta T becomes evaporation temperature minus ambient temperature. In the chart below in the cooling mode, the delta T represents condenser delta T and in the heating mode, the delta T represents evaporator delta T.

|  | Cooling mode | Heating mode |
| --- | --- | --- |
| Outdoor fan blocked/failed Or Overcharge (High side) | Overload trip High delta T High Tcond High current | Low delta T |
| Indoor blower blocked/failed | Low delta T | Overload trip |

|  | Cooling mode | Heating mode |
| --- | --- | --- |
| Or Loss of Charge (Low side) | Low delta T<br>Long run time | Low delta T<br>Long run time |
| Defrost initiation | — | High delta T |
| Compressor Fault | Current vs. Tcond | — |
| Capacity loss | % run time | % run time |

Figure 14:
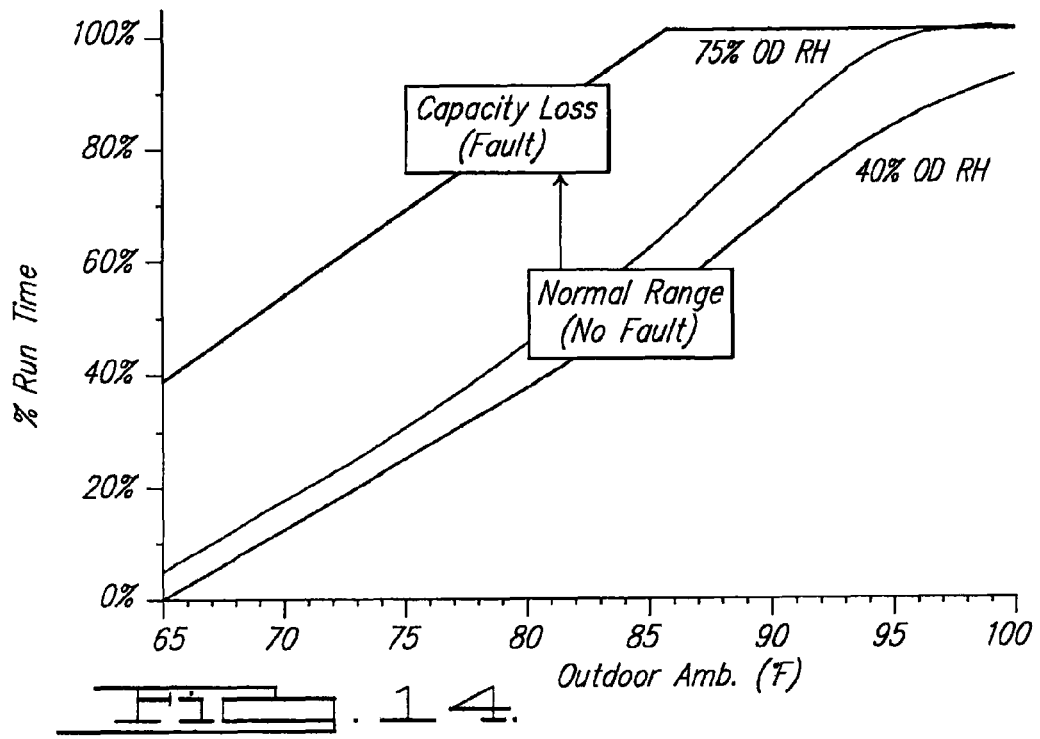
FIG. 14 is a graph showing percent run time versus outdoor ambient temperature.

Finally, it is now possible to diagnose loss of capacity with the addition of outdoor ambient sensor 334 using percent run time as shown in FIG. 14. Predicting compressor energy use is also now possible because current, voltage and run time are known. The energy usage over time can be monitored and reported.

Figure 15:
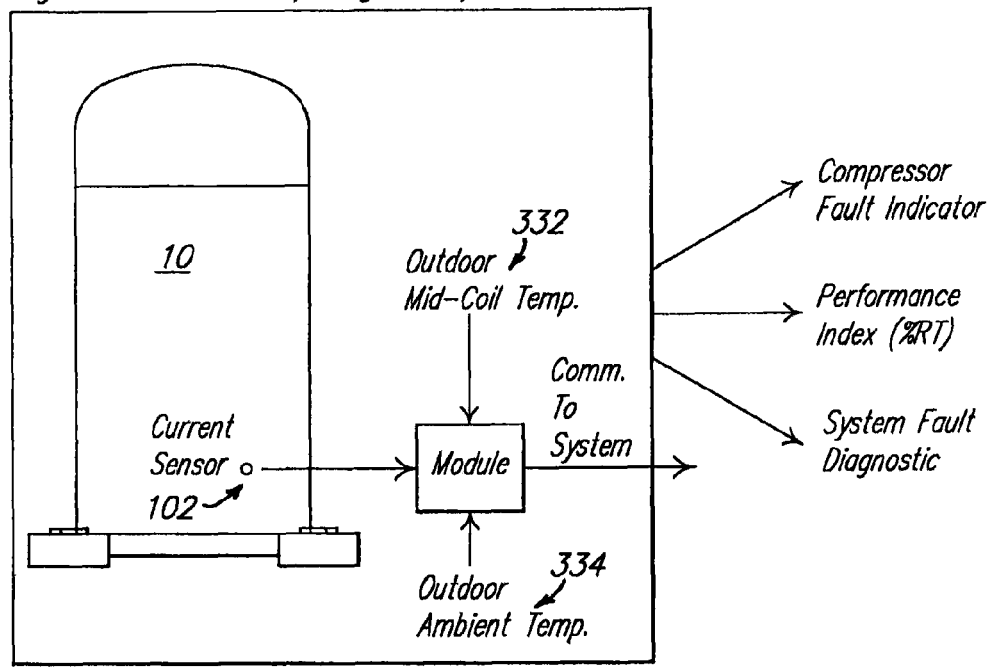
FIG. 15 is a schematic illustration of a diagnostic system in accordance with the present invention.

Overall, the implementation of an electronic diagnostic tool is illustrated in FIG. 15 with current sensing devices 102, condenser temperature sensor 332 and outdoor ambient temperature sensor 334. Since these sensors provide continuous monitoring of the system and not single switches, it is now possible to integrate safety protection capability into this control and eliminate the need for high and low pressure safety switches.

Additional diagnostic capabilities can be achieved by sensing the voltage in the power supply wires powering compressor 10. As shown in FIGS. 2 and 3 illustrate voltage sensors 402 incorporated for this purpose. Compressors with internal line breaks like temperature sensor 54 will "trip" if the supply voltage to compressor 10 falls below a specified value. This value is typically ten percent below the nominal voltage. Under this reduced voltage condition, the motor current will increase to a level that would generate enough heat to "trip" protector 54. Hence, if the voltage is known when protector 54 trips, this low voltage condition can be flagged as a specific fault. The service technician can then concentrate on finding the cause of the low voltage condition. The voltage can be sensed by several methods. It may be directly sensed at the compressor terminals as shown with sensors 402 or at other points in the electrical circuit feeding compressor 10. It may also be indirectly sensed by monitoring the control voltage of the system using a sensor 404 as shown in FIGS. 2 and 3. The control voltage is typically a low voltage circuit (24 VAC) and it is derived using a step down transformer (not shown). This control voltage would also change in direct proportion to the change in line voltage. Hence, monitoring the control voltage could provide an idea of the line voltage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system comprising logic circuitry in communication with an intelligent device, said logic circuitry processing at least one of a status of a motor protector, a current drawn by a compressor of a refrigeration system, and a demand signal as function of time, at least one of said logic circuitry and said intelligent device diagnosing a specific fault cause of said compressor based on said processing and based on an average ON time of said compressor, said intelligent device outputting said diagnosis.

2. The system of claim 1, wherein said logic circuitry diagnoses said fault cause.

3. The system of claim 1, wherein said intelligent device diagnoses said fault cause.

4. The system of claim 3, wherein said fault cause includes at least one of a trip frequency, an ON time of said compressor, and an OFF time of said compressor.

5. The system of claim 1, wherein said intelligent device is one of a compressor controller, a system controller, and a controller located remotely from said logic circuitry.

6. The system of claim 1, wherein said logic circuitry outputs a coded sequence of electrical pulses to communicate said fault cause to said intelligent device.

7. The system of claim 1, wherein said logic circuitry communicates said fault cause by selectively illuminating at least one light-emitting device.

8. The system of claim 1, wherein said logic circuitry is integrated into an electrical plug.

9. The system of claim 8, wherein said electrical plug is received on a compressor housing.

10. The system of claim 1, wherein said logic circuitry communicates said fault cause to said intelligent device.

11. The system of claim 1, wherein said processing includes determining a trip frequency of said motor protector.

12. The system of claim 1, wherein said intelligent device is operable to indicate said fault cause.

13. The system of claim 1, further comprising at least one of a, condenser and an evaporator.

14. A system comprising logic circuitry in communication with an intelligent device, said logic circuitry processing a refrigeration system operating parameter as a function of time, at least one of said logic circuitry and said intelligent device diagnosing a refrigeration system status based on said refrigeration system operating parameter and a moving window time average of a compressor operating in an ON condition, said intelligent device outputting said diagnosis.

15. The system of claim 14, wherein said refrigeration system status is a specific fault cause of said compressor.

16. The system of claim 14, wherein said logic circuitry diagnoses said refrigeration system status.

17. The system of claim 14, wherein said intelligent device diagnoses said refrigeration system status.

18. The system of claim 17, wherein said refrigeration system status includes at least one of a trip frequency, an ON time of a compressor, and an OFF time of said compressor.

19. The system of claim 14, wherein said intelligent device is one of a compressor controller, a system controller, and a controller located remotely from said logic circuitry.

20. The system of claim 14, wherein said logic circuitry outputs a coded sequence of electrical pulses to communicate said refrigeration system status to said intelligent device.

21. The system of claim 20, wherein said refrigeration system status is a specific fault cause.

22. The system of claim 14, wherein said logic circuitry communicates said refrigeration system status by selectively illuminating at least one light-emitting device.

23. The system of claim 22, wherein said refrigeration system status is a specific fault cause.

24. The system of claim 14, wherein said logic circuitry is integrated into an electrical plug.

25. The system of claim 24, wherein said electrical plug is received on a compressor housing.

26. The system of claim 14, wherein said refrigeration system status is a status of a motor protector.

27. The system of claim 14, wherein said refrigeration system status is a fault cause and said refrigeration system operating parameter is a status of a motor protector.

28. The system of claim 27, wherein said logic circuitry communicates said fault cause to said intelligent device.

29. The system of claim 14, wherein said refrigeration system operating parameter is a status of a motor protector and said refrigeration system status is a specific fault cause, said logic circuitry operable to determine a trip frequency of said motor protector to identify said specific fault cause.

30. The system of claim 14, further comprising at least one of a condenser and an evaporator.

31. The system of claim 14, wherein said logic circuitry communicates said refrigeration system status to said intelligent device.

32. A system comprising logic circuitry in communication with an intelligent device, said logic circuitry processing a status of a motor protector as a function of time, at least one of said logic circuitry and said intelligent device diagnosing a fault cause based on a moving window time average of a compressor of a refrigeration system operating in an ON condition when said motor protector is in a tripped condition, said intelligent device outputting said diagnosis.

33. The system of claim 32, wherein said logic circuitry diagnoses said fault cause.

34. The system of claim 32, wherein said intelligent device diagnoses said fault cause.

35. The system of claim 32, wherein said fault cause includes at least one of a trip frequency, an ON time of said compressor, and an OFF time of said compressor.

36. The system of claim 32, wherein said intelligent device is one of a compressor controller, a system controller, and a controller located remotely from said logic circuitry.

37. The system of claim 32, wherein said logic circuitry outputs a coded sequence of electrical pulses to communicate said fault cause to said intelligent device.

38. The system of claim 32, wherein said logic circuitry communicates said fault cause by selectively illuminating at least one light-emitting device.

39. The system of claim 32, wherein said logic circuitry is integrated into an electrical plug.

40. The system of claim 39, wherein said electrical plug is received on a compressor housing.

41. The system of claim 32, wherein said logic circuitry communicates said fault cause to said intelligent device.

42. The system of claim 32, wherein said logic circuitry is operable to determine a trip frequency of said motor protector.

43. The system of claim 32, wherein said intelligent device is operable to indicate said fault cause.

44. The system of claim 32, further comprising at least one of a condenser and an evaporator.

45. A system comprising logic circuitry in communication with an intelligent device, said logic circuitry processing a status of a motor protector of a compressor of a refrigeration system as a function of time to determine a trip frequency of said motor protector, at least one of said logic circuitry and said intelligent device diagnosing a specific fault cause based on said trip frequency, said intelligent device outputting said diagnosis.

46. The system of claim 45, wherein said logic circuitry diagnoses said fault cause.

47. The system of claim 45, wherein said intelligent device diagnoses said fault cause.

48. The system of claim 45, wherein said intelligent device is one of a compressor controller, a system controller, and a controller located remotely from said logic circuitry.

49. The system of claim 45, wherein said logic circuitry outputs a coded sequence of electrical pulses to communicate said fault cause to said intelligent device.

50. The system of claim 45, wherein said logic circuitry communicates said fault cause by selectively illuminating at least one light-emitting device.

51. The system of claim 45, wherein said logic circuitry is integrated into an electrical plug.

52. The system of claim 51, wherein said electrical plug is received on a compressor housing.

53. The system of claim 45, wherein said logic circuitry communicates said fault cause to said intelligent device.

54. The system of claim 45, further comprising at least one of a condenser and an evaporator.

* * * * *

UNITED STATES PATENT AND TRADEMARK OFFICE
CERTIFICATE OF CORRECTION

PATENT NO.          : 7,980,085 B2
APPLICATION NO.     : 12/652826
DATED               : July 19, 2011
INVENTOR(S)         : Nagaraj Jayanth et al.

It is certified that error appears in the above-identified patent and that said Letters Patent is hereby corrected as shown below:

Title Page, No. (56), References Cited, Other Publication
Page 2, Column 2, Other Publication No. 18          "eceived" should be --received--.

Column 7, Line 32          "shorted" should be --shortened--.

Column 8, Line 51          "shorted" should be --shortened--.

Column 10, Line 49          "analyses" should be --analyzes--.

Column 13, Line 26          "As shown in" should be --As shown--.

Column 14, Line 24          After "a" delete ",".

Signed and Sealed this
Eighteenth Day of October, 2011

David J. Kappos
*Director of the United States Patent and Trademark Office*